United States Patent
Baker et al.

(10) Patent No.: US 11,645,603 B1
(45) Date of Patent: May 9, 2023

(54) COMPUTER SYSTEM FOR AUTOMATIC ALERT ASSESSMENT

(71) Applicant: Wells Fargo Bank, N.A., San Francisco, CA (US)

(72) Inventors: Kimberly P. Baker, Fort Mill, SC (US); Mohammed Iradathullah Khan, Harrisburg, NC (US); Rachel Nemecek, Charlotte, NC (US); Matthew Prue, Fort Mill, SC (US); Niraj Sapkota, Charlotte, NC (US); Christopher Smith, Marvin, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 22 days.

(21) Appl. No.: 16/717,825

(22) Filed: Dec. 17, 2019

(51) Int. Cl.
*G06Q 10/06* (2012.01)
*H04L 9/40* (2022.01)
(Continued)

(52) U.S. Cl.
CPC ..... *G06Q 10/06398* (2013.01); *G06F 21/554* (2013.01); *G06Q 10/0635* (2013.01);
(Continued)

(58) Field of Classification Search
CPC combination set(s) only.
See application file for complete search history.

(56) References Cited

U.S. PATENT DOCUMENTS 7,096,502 B1 * 8/2006 Fox ..................... H04L 63/1433
　　　　　　　　　　　　　　　　　　　　　　 709/224
7,808,916 B1 * 10/2010 Futamura ............ H04L 63/1416
　　　　　　　　　　　　　　　　　　　　　　 370/242
(Continued)

FOREIGN PATENT DOCUMENTS

CN　　108230142 A　　6/2018
CN　　109242280 A　　1/2019
(Continued)

OTHER PUBLICATIONS

P. Valladares, W. Fuertes, F. Tapia, T. Toulkeridis and E. Pérez, "Dimensional data model for early alerts of malicious activities in a CSIRT," 2017 International Symposium on Performance Evaluation of Computer and Telecommunication Systems (SPECTS), 2017, pp. 1-8, doi: 10.23919/SPECTS.2017.8046771. (Year: 2017).*

(Continued)

*Primary Examiner* — Crystol Stewart
(74) *Attorney, Agent, or Firm* — Shumaker & Sieffert, P.A.

(57) ABSTRACT

An example system configured to assess risk includes a server, an end-user system that generates an activity report in response to an employee performing an action via a computer device communicatively coupled to the end-user system, and a data warehouse that assigns a category to the activity report and populates a data table in a report database based the category of activity report. The server applies a rule to the populated data table. The rule is selected based on the category of the activity report. When the rule indicates that the action represents risky behavior, the server generates a current alert report. After performing validation checks on the current alert report, when the alert report passes the validation checks, the server transmits the current alert report in accordance with the rule. Additionally, the server stores a response to the alert report.

19 Claims, 3 Drawing Sheets

(51) Int. Cl.
*G06F 21/55* (2013.01)
*H04L 67/50* (2022.01)
*G06Q 10/0639* (2023.01)
*G06Q 10/0635* (2023.01)

(52) U.S. Cl.
CPC ...... *H04L 63/1416* (2013.01); *H04L 63/1425* (2013.01); *H04L 63/1433* (2013.01); *H04L 63/1441* (2013.01); *H04L 67/535* (2022.05)

(56) References Cited

U.S. PATENT DOCUMENTS

| | | | | |
|---|---|---|---|---|
| 8,448,126 | B2* | 5/2013 | Laight | G06Q 10/06 705/7.11 |
| 9,152,694 | B1* | 10/2015 | Padidar | H04L 63/105 |
| 9,923,931 | B1* | 3/2018 | Wagster | H04L 63/30 |
| 10,394,691 | B1* | 8/2019 | Cole | G06F 11/3612 |
| 2010/0198636 | A1* | 8/2010 | Choudhary | G06Q 10/0635 705/7.28 |
| 2011/0131105 | A1* | 6/2011 | Aonuma | G06Q 30/06 705/24 |
| 2016/0180264 | A1 | 6/2016 | Beck et al. | |
| 2016/0226905 | A1* | 8/2016 | Baikalov | H04L 63/1433 |
| 2016/0330219 | A1* | 11/2016 | Hasan | G06N 5/025 |
| 2017/0063901 | A1* | 3/2017 | Muddu | H04L 63/1416 |
| 2017/0093902 | A1* | 3/2017 | Roundy | G06F 21/554 |
| 2017/0251007 | A1* | 8/2017 | Fujisawa | H04L 63/1425 |
| 2017/0359220 | A1* | 12/2017 | Weith | H04L 63/12 |
| 2019/0141058 | A1* | 5/2019 | Hassanzadeh | H04L 63/0227 |
| 2019/0163813 | A1* | 5/2019 | Tomlinson | G06F 40/205 |
| 2019/0373000 | A1* | 12/2019 | Garnett | H04L 67/18 |
| 2019/0389599 | A1* | 12/2019 | Dillard | G07C 5/0825 |
| 2020/0128047 | A1* | 4/2020 | Biswas | H04L 63/102 |
| 2021/0019666 | A1* | 1/2021 | Tsukamoto | G06K 9/6262 |
| 2021/0312351 | A1* | 10/2021 | Pourmohammad | G06Q 10/0635 |

FOREIGN PATENT DOCUMENTS

| | | |
|---|---|---|
| CN | 109508825 A | 3/2019 |
| JP | 2006185080 A | 7/2006 |
| WO | 2016182519 | 11/2016 |

OTHER PUBLICATIONS

Q. Chen, L. Bao, L. Li, X. Xia and L. Cai, "Categorizing and Predicting Invalid Vulnerabilities on Common Vulnerabilities and Exposures," 2018 25th Asia-Pacific Software Engineering Conference (APSEC), 2018, pp. 345-354, doi: 10.1109/APSEC.2018. 00049. (Year: 2018).*

Alles et al., "Continuous Monitoring of Business Process Controls: A Pilot Implementation of a Continuous Auditing System at Siemens," Sep. 1, 2005, 37 pp.

Coderre et al., "Global Technology Audit Guide Continuous Auditing: Implications for Assurance, Monitoring, and Risk Assessment," The Institute of Internal Auditors, ISBN 0-89413-586-4,2005, 37 pp. (Applicant points out, in accordance with MPEP 609.04(a), that the year of publication, 2005, is sufficiently earlier than the effective U.S. filing date, so that the particular month of publication is not in issue.).

* cited by examiner

COMPUTER SYSTEM FOR AUTOMATIC ALERT ASSESSMENT

TECHNICAL FIELD

This disclosure relates to computer systems that access activity reports for indicia of risky behavior.

BACKGROUND

In various industries and processes, employees tend to act within a range of expected behaviors. In some cases, actions outside of the range of expected behaviors can be seen as anomalous, which may indicate a heightened risk of behavior that can negatively affect customers and lead to undesirable outcomes for customers and employers. That is, when an actor takes an action that is not within the range of expected behaviors, the action may indicate that the actor is acting in a way that might not be in the best interests of those who are the target of the behavior. However, in large organizations that that perform a large volume of transactions daily, monitoring the behavior of any one employee is difficult. Bad behavior may get lost in the large volume of data. Additionally, even if presented with this large value of data, managers may not be able to manually review and recognize patterns of behavior that are either indicative of risky behavior or indicative of insufficient training. Thus, managing a large workforce tasked with handling important, and sometime complex, transactions can be difficult.

SUMMARY

In general, this disclosure describes a computer-based platform, with a frontend and backend system, to remotely monitor employees and assess risk posed by actions of the employee using an automated rules engine. An example computer-based platform is configured to assess an action and/or group of actions (e.g., a number of times a certain action occurs for a given employee, given branch location, etc.) through rules, models, and/or algorithms to detect potential risks, such as security risks, behavior risks, compliance risks, and the like. When a particular action is determined to be "risky," the platform is configured to send an automated alert to the manager of the branch employee identified as performing the risky action. In some examples, the platform may be used by an institution having a plurality of office locations. In these examples, the monitored employee actions may include customer interactions and other actions related to customer service.

In one example, a financial institution may have a plurality of office branches with numerous employees interacting with multiple customers per day. Often, these interactions resulted in actions within the computing system of the financial institution. Example employee actions to be monitored include opening of new accounts, closing of accounts, account changes, printing of checks, completing teller transactions without checking customer identification ("known ID"), transactions on accounts having foreign addresses, individual transactions performed by a teller/banker, and the like. It is impractical for managers to supervise the volume of computer-based actions generated by these interactions. Even if presented with the data, these managers would not be able to reliable or consistently identify risky behavior. The computer-based platform may be configured to monitor actions within the given office branch in real-time by processing a live-stream of actions or on a periodic basis (e.g., hourly or daily) by processing a batch of actions.

An example system configured to assess risk includes a server, an end-user system that generates an activity report in response to an employee performing an action via a computer device communicatively coupled to the end-user system, and a data warehouse that assigns a category to the activity report and populates a data table in a report database based the category of activity report. The server applies a rule to the populated data table. The rule is selected based on the category of the activity report. When the rule indicates that the action represents risky behavior, the server generates a current alert report. After performing validation checks on the current alert report, when the alert report passes the validation checks, the server transmits the current alert report in accordance with the rule. Additionally, the server stores a response to the alert report.

The details of one or more examples are set forth in the accompanying drawings and the description below. Other features, objects, and advantages will be apparent from the description and drawings, and from the claims.

DETAILED DESCRIPTION

Figure 1:
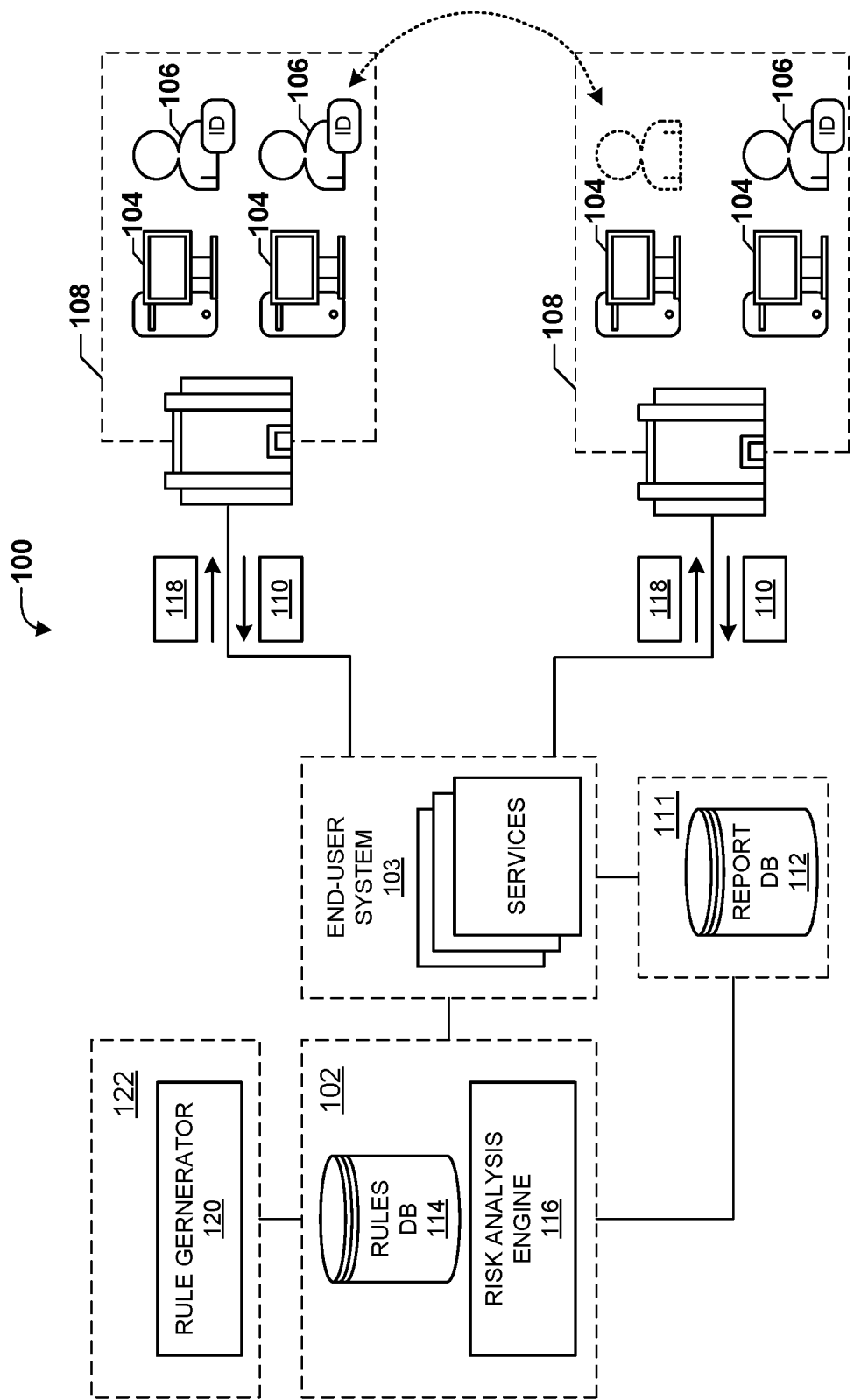
FIG. 1 is a block diagram illustrating an example system configured to assess customer service activity according to the techniques of this disclosure.

Because employee engage is sensitive and/or important activities that implicate customer satisfaction and regulatory compliance, these activities need to be supervised. However, employee generate a large amount of data when performing tasks on computer devices. Systems that feed supervisors too much information do not facilitate monitoring. For example, large amounts of alerts may be generated that may not be issues for certain branches or types of roles. Additionally, activity in one context may be indicative of risky behavior with one context but not risky in another context. Processing, storing and presenting a large volume of alerts, especially low-quality alerts with no context, can overwhelm computing system associated with employee monitoring (e.g., require too much bandwidth and/or memory). As describe below, the system of the present disclosure provides a technical solution to these problems by providing a computer-based platform to conserve network resources by, for example, categorizing the activity reports, selectively applying flexible rules, and performing quality assurance validation used to avoid unnecessary or invalid alerts.

The platform is configured to compare actions against a set of rules, models, and/or algorithms to identify whether the respective action is potentially "risky." A risky action may relate to fraud/security risks, compliance risks, sales-practice/behavior risks, and the like. The platform then sends an automated alert to a manager of the employee identified as performing the risky action. The alert identifies the risky action and the responsible employee and prompts the manager to investigate further. In some examples, the platform may provide an opportunity for the manager to close the alert and/or annotate the alert with an explanation (e.g., documenting the managers follow-up actions to address or dismiss the alert).

The set of rules, models, and/or algorithms applied by the platform to evaluate the monitored actions vary based on conditions surrounding the action. The rules may, for example, be applicable to a certain location, to a certain employee type, or to a particular individual (e.g., an individual that may be flagged for increased risk sensitivity, etc.). For example, branches along a border with a foreign country are known to have a higher percentage of accounts that have addresses in the bordering foreign country. In this example, a branch near the border may have a higher threshold for initiating an alert for opening new accounts with a foreign address than a different branch located in the middle of the country. As another example, the rules, models, and/or algorithms applied to the actions of a loan officer may be different than the rules, models, and/or algorithms applied to a teller.

The platform is configured to compare the actions against the relevant set of rules, models, and/or algorithms on the micro level (i.e., individual transaction) and the macro level (i.e., groups of transactions). In some scenarios, one action performed by an employee may trigger an alert. For example, in response to processing an action of opening an account with missing key information, the platform may send an alert to the manager of the employee identified as performing the action. In other scenarios, a single action performed by an employee is not enough on its own to raise an alert. For example, tellers often bypass requesting an ID for processing a transaction for a customer if they know the customer (referred to as a "known ID" exception). However, if the same teller performs known ID transactions more than a threshold number of times in a given day, it may be considered risky behavior. In this case, in response to processing a group of known ID actions, as opposed to an individual known ID action, the platform may send an alert to the manager of the employee identified as performing the group of actions. Additionally, actions may be compared to a historical record of the employee's actions. In some examples, the platform is configured to analyze risk reports to identify potentially systemic factors that are driving the risky behavior. For example, if multiple employees at a branch are flagged with the same or similar risky behavior, the platform may generate a branch-level alert identifying the behavior.

FIG. 1 is a block diagram illustrating an example system 100 configured to assess and supervise customer service activity according to the techniques of this disclosure. The system 100 monitors operational risk within an institution. The system 100 includes a platform server 102, an end-user system 103, and computer devices 104. The platform server 102 is a processing platform that is configured to analyze computer-based actions of users 106 to detect behavior that is indicative of risk and automatically generate risk reports according to the teachings of this disclosure. The platform server 102 may execute services in one or more physical and/or virtual environments (e.g., virtual machines, containers, etc.). In some examples, the platform server 102 is hosted in a secure cloud environment.

Computer devices 104 represent examples of various types of computers (e.g., laptops, desktops, workstations, thin clients connected to virtual machines, tablets, smartphones, etc.) that may be used by the users 106, e.g., for performing tasks for customers. In the illustrated example, the computer devices 104 are located at various institutional locations 108 (e.g., branches, etc.). The computer device 104 stores an identifier (ID) that uniquely identifies the institutional location 108 in which it is located (sometimes referred to as the "institution ID"). Additionally, to use the computer devices 104, the user 106 provides credentials (e.g., a username and password, a biometric token, etc.) that are associated with a user ID that uniquely identifies the user 106. From time-to-time, the users 106 may log into one of the computer devices 104 at different institutional locations 108. The user ID and the institution ID facilitate selecting which rules to apply to reports 110 generated by the computer devices 104.

The computer device 104 are coupled to the end-user system 103 via an internal network (e.g., an intranet, a local area network (LAN), a virtual private network (VPN), etc.). In the illustrated example of FIG. 1, the computer devices 104 are communicatively coupled to the end-user system 103 (e.g., via a wired and/or wireless communication system, etc.) The end-user system 103 is a server-based platform that hosts services used to facilitate various aspects of a business. For example, though a network (such as an intranet), the computer device 104 may access the services to open accounts, process applications, and/or performs transactions, etc. The users 106 interact with the end-user system 103 via an application executing on the computer devices 104.

In general, the users 106 (who may be employees of a business enterprise, such as a bank or other business) may assist customers with various transactions using end-user system 103 accessed through the computer devices 104. For example, for a bank, the user 106 may assist a customer to open an account, add or withdraw funds to or from an account, open a line of credit or credit card, close an account, or the like. Each of the actions performed by the user 106 relating to a customer generates the activity report 110 that includes activity data (e.g., the user ID, the institution ID, what task the user 106 performed, who the user 106 performed the task for, etc.) and metadata (e.g., time, date, duration, etc.). For example, a report 110 may be generated when the user 106 opens a new account using customer contact information. In some examples, computer devices 104 may, via a process executing in the background, issue the activity reports 110 to the platform server 102 via a communication channel established by an enterprise access portal. Because the users 106 perform transactions using the end-user system 103, the end-user system 103 is aware of activity of the users 106. For illustrative purposes, FIG. 1 depicts the activity reports 110 being generated by the computer devices 104 (e.g., by a process or service executing on the computer device 104). In some examples, the end-user system 103 may generate the activity reports 110 based on user interactions with services executing on the end-user system 103 through the computer devices 104.

In the illustrated example, end-user system 103 is connected to a data warehouse 111. The data warehouse 111 aggregates data from the various systems across the institution. The data warehouse 111 performs initial data processing and data aggregation to place incoming data (e.g., the activity reports 110, etc.) into data tables to be retrieved and processed by other systems. In the illustrated example, the data warehouse 111 includes a report database 112. The report database 112 stores data tables that hold the data and the metadata included with the activity reports 110. The data tables are generated using flexible input fields to facilitate different activity reports assigned to different categories having different reporting data and activity reports within the same category having different reporting data. The report database 112 stores these activity reports 110 for an amount of time to facilitate batch processing (e.g., twice a day, once a day, etc.) and/or to facilitate rules that consider prior actions of the user 106. In the illustrated example, the report database 112 is a single database. Alternatively, in some examples, the report database 112 may be split across two or more databases. For example, the databases may store activity reports 110 from different institutional locations 108 or may separate the activity reports 110 by job function or activity category, etc.

The platform server 102 is connected to the end-user system 103 via secure connection, such as a virtual private network. The platform server 102, according to the techniques of this disclosure, analyzes the activity reports 110, using rules, to determine whether an action or a group of actions is/are indicative of risky behavior. In the illustrated example, the platform server 102 includes a rules database 114 and a risk analysis engine 116.

Figure 2:
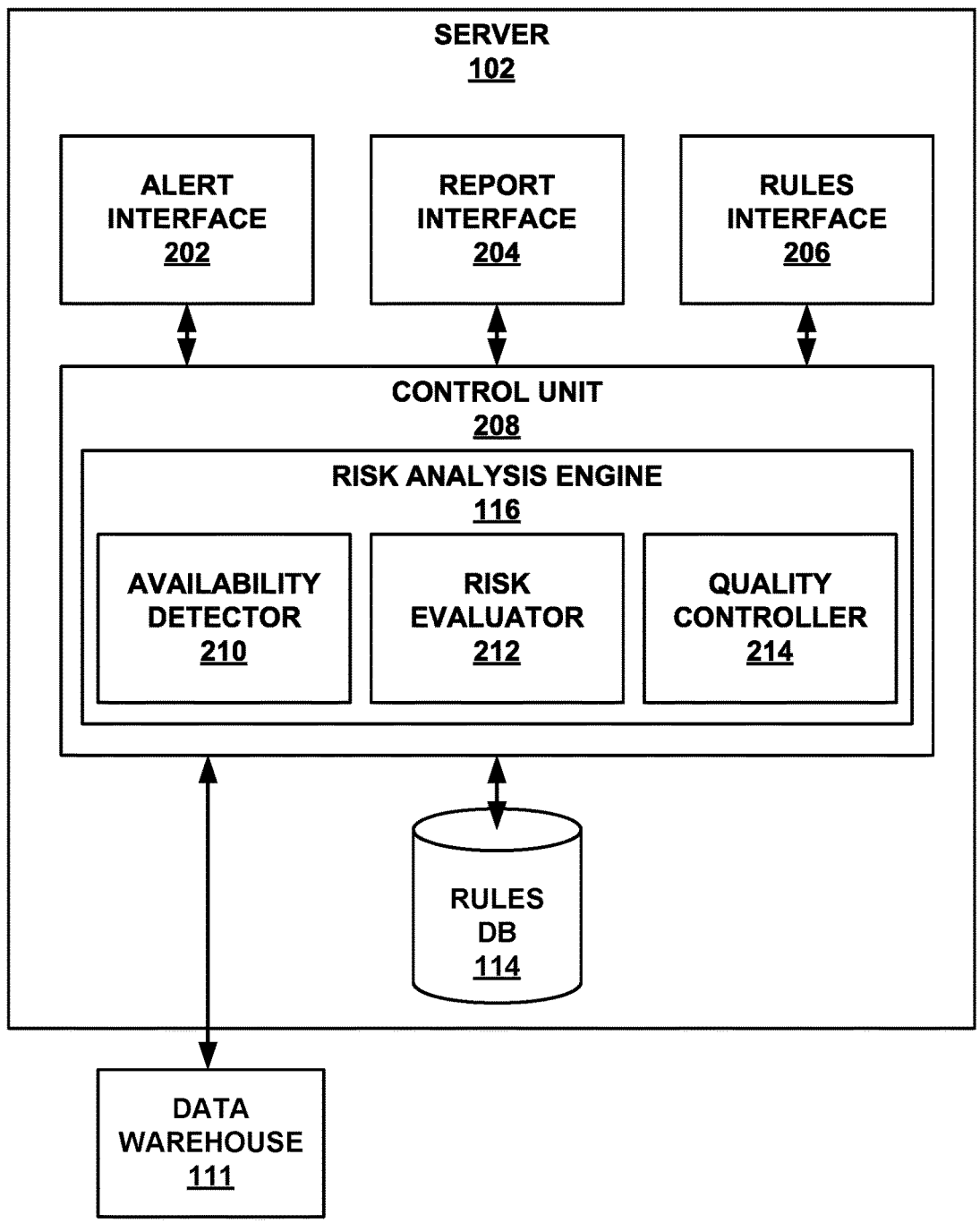
FIG. 2 is a block diagram illustrating an example set of components of a server configured to perform the techniques of this disclosure.

The rules database 114 represent one or more respective computer-readable storage media, which may be included within the platform server 102 as shown in the examples of FIGS. 1 and 2. Alternatively, one or more of the report database 112 and the rules database 114 may be stored in a remote device (not shown) to which the platform server 102 may be communicatively coupled. The computer-readable storage media may be one or more hard disks, a flash drive, random access memory (RAM), or other such computer-readable storage media. In some examples, the report database 112 and the rules database 114 are incorporated into an enterprise data warehouse.

The rules database 114 stores the rules used to analyze and evaluate the activity reports 110. The rules are sets of criteria, models, and/or algorithms that when applied to a report or a set of reports, output a determination that the action underlying the activity report is risky. The rules define a scope of reports used to evaluate the underlying riskiness of behavior that cause the activity report 110 to be generated. For example, the rules may be configured to detect potential risks, such as security risks, behavior risks, and/or compliance risks. Additionally, in some examples, the rules define incident reporting criteria (e.g., report fields, metadata, etc.) used to generate an incident report 118 when a risky behavior is detected. The rules are categorized such that rules may be triggered or modified based on one or more identifiers included in the activity report, such as the ID of the user 106 or the ID of the institutional location 108. In some examples, different rules apply to different institutions. For example, a rule opening accounts associated with foreign addresses may be different for an institution located in a border region than an institution not located near a border region. In some examples, different rules apply to different job duties. For example, the rules that apply to the actions of a loan officer may be different than the rules that apply to the actions of a teller. In some examples, the different rules may apply to different users 106. For example, a user may trigger the same rules regardless from which institutional location 108 the user 106 interacts with the computing devices 104.

As described in more detail in connection with FIG. 2 below, the risk analysis engine 116, from time-to-time, analyzes activity reports 110 and/or data from the activity reports 110 included in the report database 112 against relevant sets of rules, models, and/or algorithms on a micro level (e.g., on individual activities) and on a macro level (e.g., on groups of activities). For example, one activity by a user 106 may trigger an alert. As another example, a pattern of behavior by the same user 106 or group of related users 106 may trigger an alert. In some examples, the risk analysis engine 116 analyzes the activity reports 110 on a real-time basis. Alternatively, or additionally, in some examples, the risk analysis engine 116 analyzes the activity reports 110 periodically (e.g., twice daily, once daily, once every two days, etc.). When a rule indicates that an activity report 110 or set of activity reports 110 is indicative of risky behavior, the risk analysis engine 116 automatically generates an alert 118, writes the alert to a production table to be forwarded to a manager of the user 106 identified as performing the risky behavior. The risk analysis engine 116 validates the generated alerts 118. In some examples, the risk analysis engine 116 analyzes the volume of the same or similar (e.g., within the same category, etc.) alerts 118. An unexpectedly high volume of the same or similar alerts 118 may signify that the rule used to generate the alert 118 should be reviewed. In some examples, the risk analysis engine 116 performs a data quality check to determine whether the mandatory data (e.g., fields in the report database 112 that are identified as required by the rule that generated the report 118) is in the production table. Missing data or invalid data may signify that the process to generate the activity report 110 may need to be reviewed. For example, non-determinative data may be marked as required by a rule when such data would provide context to facilitate a manager reviewing the alert 118. In response to receiving a validated alert 118, the manager may append information to the alert 118. In some such examples, the risk analysis engine 116 stores the information in association with the corresponding activity report 110. In some examples, the triggered rule may specify which person within the institution is to receive the alert 118.

In the illustrated example, the system 100 includes a rule generator 120 operating on a rule server 122 that is in communication with the platform server 102. The rule generator 120 serves as a platform to analyze activity reports 110 and alerts 118 generated based on the activity reports 110 and generate rules. The rule generator 120 receives symbolic logic that defines behavior to be monitored. The rule generator 120 compiles the symbolic logic into a rule, and stores that rule into the rules database 114.

FIG. 2 is a block diagram illustrating an example set of components of platform server 102 from FIG. 1. In the illustrated example, the platform server 102 includes an alert interface 202, a report interface 204, a rules interface 206, and a control unit 208.

The alert interface 202, the report interface 204, and the rules interface 206 represent interfaces for receiving activity reports 110, sending alerts 118, and providing analytical data and receiving generated rules, respectively. For example, alert interface 202, the report interface 204, and the rules interface 206 may represent one or more of a network interface, user interfaces (e.g., a keyboard, mouse, touchscreen, command line interface, graphical user interface (GUI), or the like), monitors or other display devices, or other such interfaces for receiving input from and providing output to users and other computing devices either directly or remotely. In accordance with the techniques of this disclosure, the platform server 102 receives activity reports 110 from the computer devices 104 of FIG. 1 via report interface 204, sends the alerts 118 to the institutional locations 108 (e.g., to a computer device 104 of a manager, etc.) via the alert interface 202, and provides analytical data to and receives generated rules from the rule generator 120 via the rules interface 206.

The control unit 208 represents one or more hardware-based processing units implemented in circuitry. For example, control unit 208 and the components thereof (e.g., the availability detector 210, the risk evaluator 212, and the quality controller 214 of the risk analysis engine 116, etc.) may represent any of one or more processing units, such as microprocessors, digital signal processors (DSPs), field programmable gate arrays (FPGAs), application specific integrated circuits (ASICs), or other such fixed function and/or programmable processing elements. Control unit 130 may further include a memory for storing software and/or firmware instructions to be executed by the processing units thereof. Thus, the functionality of control unit 208, the availability detector 210, the risk evaluator 212, and the quality controller 214 may be implemented in any combination of hardware, software, and/or firmware, where software and firmware instructions may be executed by hardware-based processing units implemented in circuitry.

The availability detector 210 pulls activity reports 110 for the processing period (e.g., from the data warehouse 111 that includes the report database 112). For example, at seven o'clock P.M. every day, the availability detector 210 may pull activity reports 110 in the report database 112 that are date-stamped with from five o'clock P.M. the previous day to five o'clock P.M. on the current day. The availability detector 210 counts the activity reports 110 to be processed to ensure sufficient data exists in report database 112 to execute the process code. In some examples, the availability detector 210 stops the process if the number of records does not satisfy a record threshold and continues the process upon input from an operator. In some examples, the availability detector 210 additionally pulls records that span a "lookback period" to ensure activity records 110 that are created before, but received after, the processing period deadline are analyzed. For example, the look back period might be three hours. In such examples, the availability detector 210 runs a de-duplication process to ensure that duplicate alerts are not created.

The risk evaluator 212 processes the pulled activity reports 110 to determine whether the activity reports are indicative of risky behavior. For each activity report 100, the risk evaluator 212 selects one or more rules to apply to the activity report 100. In some examples, the risk evaluator 212 filters the possible rules based on one or more characteristics of the activity report, such as the ID of the associated user 106, the ID of the associated institutional location 108, or the category of activity (e.g., a deposit activity, a withdraw activity, an account opening activity, etc.). The risk evaluator 212 then compares the information in the activity report 110 to the criteria of the selected rule. When the criteria are satisfied, the risk evaluator 212 generates an alert report that includes information specified by the selected rule.

The quality controller 214 performs quality control on the alert reports generated by the risk evaluator 212. The quality of the data included on the alert reports is validated. For example, the quality controller 214 may check for missing values, duplication, consolidation logic and record counts. Alert reports that cannot be validated are output to a table and sent via an automated communication for review. Subsequently, alert reports that are determined not to be valid are discarded. In some examples, the quality controller 214 validates the volume of produced alert reports. The quality controller 214 checks the volume of alerts produced against the volume of alerts which were expected for a particular day. In some examples, the expected volume of reports is determined based on a per user, a per institutional location and/or a per company basis. To determine whether the volume of alerts to be expected for a particular day, the quality controller 214 calculates an expected range. If the volume of alerts produced are determined to be within the expected range, the quality controller 214 forwards the alert reports to be automatically sent as alerts 118 to the rule-specified recipients. In some examples, the expected range is a number of standard deviations (e.g., two or three standard deviations) from the mean number of alerts generated over a period of time (e.g., two weeks, three weeks, etc.). In some examples, different activities within a same category produces different data in the activity reports 110 that populated different fields in the associated data table. In some such examples, the rule may designate some fields to be required. The quality controller 214 determines whether the alert 118 is valid based on whether the required fields where populated with data in a valid range in the alert report used to generate the alert 118. A field may be marked as required by the rule used to generate the alert report. In some examples, required fields may be determinative data (e.g., data used to determine whether the rule is triggered) and/or supporting data (e.g., metadata, non-determinative data, etc.) that provides context to evaluate the alert 118 by, for example, a manager.

Figure 3:
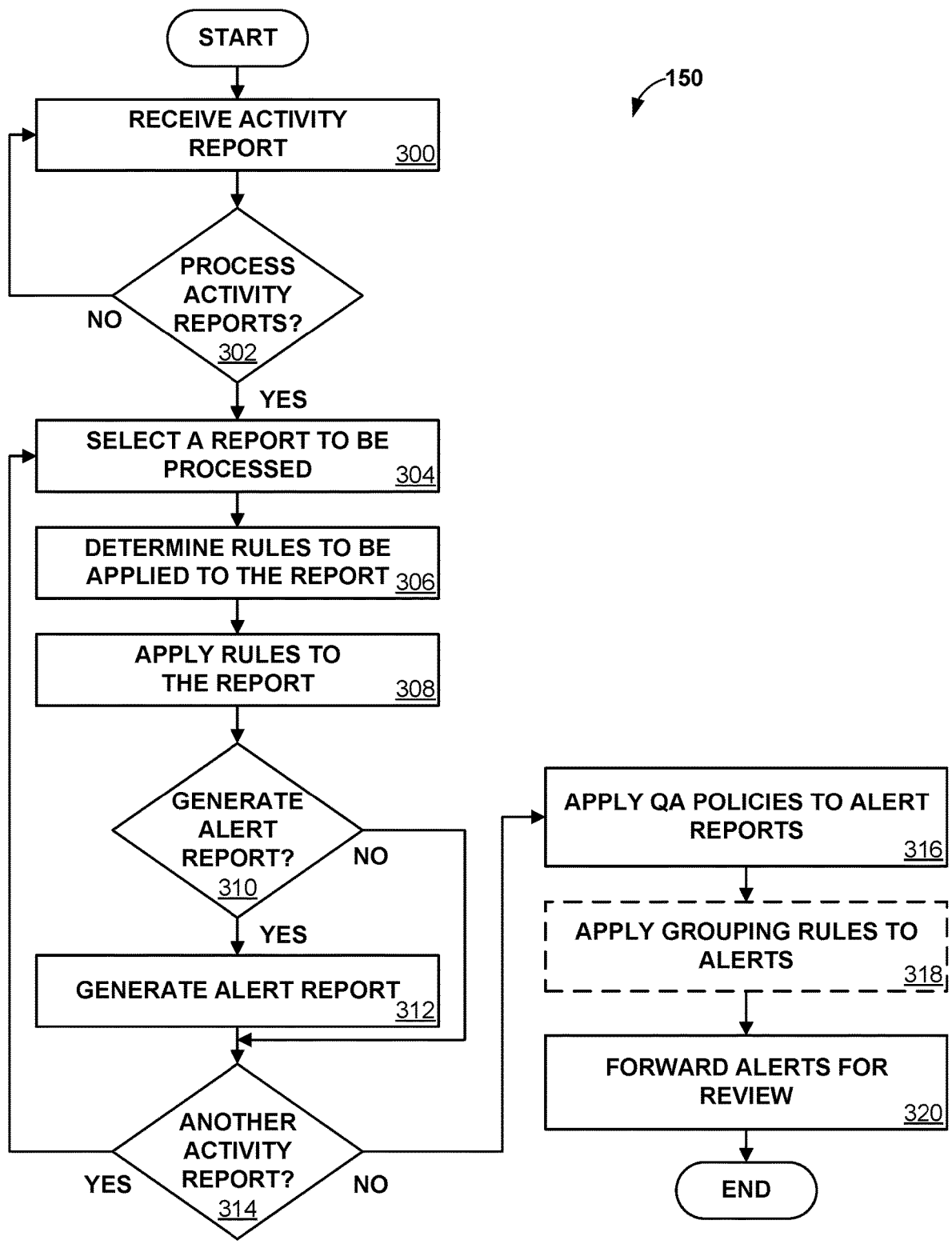
FIG. 3 is a flowchart illustrating an example method of analyzing activity reports for activity associated with risk according to the techniques of this disclosure.

FIG. 3 is a flowchart illustrating an example method 150 of generating alerts 118 according to the techniques of this disclosure. For purposes of example and explanation, the method of FIG. 3 is explained with respect to server 102 of FIGS. 1 and 2. However, it should be understood that other computer devices may be configured to perform this or a similar method.

The method may be used, for example, when activity by a user 106 on a computer device 104 creates an activity report 118. For example, a user 106 may use the computer device 104 to accept a deposit without a valid ID. In some example, these activity reports 118 are processed as described in the method 150 shortly after being received. Alternatively, the activity reports 118 are aggregated in the report database 112 and processed in batches. For example, the activity reports 118 that accumulate in a 24-hour period may be processes every day at 5 o'clock PM. The activity reports 118 are categorized and one or more rules are selected based on the category. For example, an activity report 118 based on accepting a deposit without a valid ID may be categorized as a deposit-related activity and/or a teller-related activity and deposit and/or teller related rules may be applied to the activity report 118. A rule may be based on, for example, average number of known ID exceptions for a teller with the experience of the user 106 associated with the activity report 118 and whether the user 106 has previously performed a known ID exception transaction for the customer before. If the rule is satisfied, the system generates an alert record. Quality control is performed on the alert records. Alert records that do not satisfy quality control are discarded. In some examples, activity records are bundled by, for example, user 106, institutional location 108, and/or by activity category. The activity records are transformed in to alerts 118 and transmitted to, for example, a manager of the user 106.

Initially, the server 102 receives an activity report 110 and places the activity report 110 in the report database 112 (block 300). The server 102 determines whether to process the activity report(s) 110 (block 302). For example, the server 102 may process the activity report 110 immediately upon receipt. As another example, the server 102 may wait a threshold period of time and/or until a threshold number or activity reports 110 are received to process the activity reports 110 in a batch. When the server 102 is to process the activity reports (YES branch of 302), the server 102 loads the activity reports 110 from the report database 112 to be processed and selects one of them (block 306). When the server 102 is not to process the activity reports (NO branch of 302), the server 102 continues to collect activity reports 110 until the threshold(s) to process the activity reports 110 is met. The server 102 determines which rule or set of rules to apply to the selected activity report 110. For example, the server 102 may filter available rules using characteristics of the activity report 110. The server 102 then applies the selected rule(s) to the activity report 110 (block 308). The server 102 determines whether to generate an alert record based on whether the activity report 110 satisfies the criteria of the selected rule(s) (block 310). Based on the determination to generate the alert record (YES branch of 310), the server 102 generates the alert record (block 312). When the activity report 110 does not satisfy the rule, the server 102 does not generate and alert record (NO branch of 310) The server 102 continues to process the activity reports 110 until all the activity reports in the batch are processed (block 314).

Once all of the activity reports in the batch are processes (NO branch of 314), the server 102 applies quality assurance policies to the created alert records (block 316). In some examples, the server 102 applies grouping rules to the alert records (block 318). The grouping rules define criteria for alert bundling and behavior bundling. For example, a grouping rule may bundle two related alerts that could be indicative to a pattern of risky behavior such that the alerts generated from the alert records are sent together. As another example, the bundling rule may bundle alert records related to certain types of behavior that occur within the same institutional location 108 that may be indicative of systemic risky behavior at that institutional location 108. The server 102 then generates the alert 118 and forwards the alerts 118 for review (320). The alert 118 may be reviewed according to the criteria of the rule that generated the alert 118 or the bundling rule that bundled alerts 118 together (e.g., certain bundled alerts may be escalated based on the nature of the alert, etc.). For example, an alert 118 may be generated based on a rule regarding processing a transaction for a customer while bypassing a request for an ID may be forwarded to a manager of the institutional location 108. However, a bundling rule may cause multiple such alerts at the same institutional location 108 to be bundled together and escalated to a regional manager. Thus, the server 102 generate alerts with context to allow decision makers (e.g., managers, reginal managers, presidents, etc.) to appropriately review and take action to correct the underlying behavior that generated the alert(s) 118.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:
1. A method comprising:
receiving, by an end-user system of an institution, data representative of a plurality of actions performed by employees of the institution via a plurality of computer devices at one or more institution locations communicatively coupled to the end-user system via a network;
receiving, by a platform server connected to the end-user system and from one of the end-user system or a computer device of the plurality of computer devices, an activity report that includes activity data for an action of the plurality of actions performed by a given employee via the computer device at a given institution location of the one or more institution locations, wherein the activity data includes a user identifier (ID) associated with the given employee and an institution ID associated with the given institution location;
selecting, by the platform server, a rule to apply to the activity report based on at least one of the user ID or the institution ID of the activity report;
applying, by the platform server executing a rules engine, the rule to the activity report;
when the rule indicates that the activity report is indicative of risky behavior, generating, by the platform server, a current alert report;
determining, by the platform server, whether the current alert report is valid or invalid by performing validation checks on the current alert report based on valid data values associated with the at least one of the user ID or the institution ID of the activity report, wherein determining that the current alert report is invalid comprises identifying
missing or invalid data values for a required data field in the current alert report;
when the current alert report does not pass the validation checks and is determined to be invalid, discarding, by the platform server, the current alert report; and
when the current alert report passes the validation checks and is determined to be valid, transmitting, by the platform server, the current alert report to a manager associated with at least one of the user ID or the institution ID of the activity report in accordance with the rule, and storing, by the platform server, a response to the current alert report.

2. The method of claim 1, wherein determining whether the current alert report is valid or invalid further comprises performing validation checks on the current alert report based on alert report volumes associated with the at least one of the user ID or the institution ID of the activity report, and wherein determining that the current alert report is invalid further includes:
- determining an expected alert report volume, including determining a mean number of alert reports associated with the at least one of the user ID or the institution ID of the activity report and indicative of the same risky behavior as the current alert report generated during a first time period;
- determining a number of total alert reports associated with the at least one of the user ID or the institution ID of the activity report and indicative of the same risky behavior as the current alert report generated during a second time period that includes the current alert report and is subsequent to the first time period, the number of total alert reports including the current alert report;
- when the number of total alert reports is outside of an expected range defined with respect to the expected alert report volume, identifying an unexpected alert report volume of alert reports indicative of the same risky behavior as the current alert report and generated during the second time period; and
- determining that the current alert report does not pass the validation checks and is invalid.

3. The method of claim 2, wherein the expected range is defined as at least two standard deviations around from the mean number of alert reports.

4. The method of claim 2, wherein the first time period is two weeks.

5. The method of claim 1, wherein determining that the current alert report is invalid includes:
- designating, by the rule associated with the at least one of the user ID or the institution ID of the activity report, at least one data field in the current alert report as the required data field;
- when the required data field in the current alert report does not include a data value in a valid range, identifying invalid data values for the required data field in the current alert report; and
- determining that the current alert report does not pass the validation checks and is invalid.

6. The method of claim 1, further comprising:
assigning, by a data warehouse connected to the end-user system and the platform server, a category to the activity report based on the activity data included in the activity report; and
populating, by the data warehouse, a data table in a report database with the activity data of the activity report, wherein the data table is associated with the category of the activity report, and wherein the data table has flexible input fields,
wherein the flexible input fields of the data table are populated by activity data of a plurality of activity reports assigned to the same category, wherein one or more of the activity reports have activity data that includes one or more different data fields that are not shared by all activity reports assigned to the same category.

7. The method of claim 1, wherein determining that the current alert report is invalid includes:
- designating, by the rule associated with the at least one of the user ID or the institution ID of the activity report, at least one data field in the current alert report as the required data field;
- when the required data field in the current alert report does not include a data value, identifying missing data values for the required data field in the current alert report; and
- determining that the current alert report does not pass the validation checks and is invalid.

8. A system comprising:
an end-user system of an institution, the end-user system configured to receive data representative of a plurality of actions performed by employees of the institution via a plurality of computer devices at one or more institution locations communicatively coupled to the end-user system via a network; and
a platform server connected to the end-user system, the platform server configured to:
- receive, from one of the end-user system or a computer device of the plurality of computer devices, an activity report that includes activity data for an action of the plurality of actions performed by a given employee via the computer device at a given institution location of the one or more institution locations, wherein the activity data includes a user identifier (ID) associated with the given employee and an institution ID associated with the given institution location;
- select a rule to apply to the activity report based on at least one of the user ID or the institution ID of the activity report;
- apply the rule to the activity report using a rules engine;
- when the rule indicates that the activity report is indicative of risky behavior, generate a current alert report;
- determine whether the current alert report is valid or invalid by performing validation checks on the current alert report based on valid data values associated with the at least one of the user ID or the institution ID of the activity report, wherein to determine that the current alert report is invalid, the platform server is configured to identify
missing or invalid data values for a required data field in the current alert report;
- when the current alert report does not pass the validation checks and is determined to be invalid, discard the current alert report; and
- when the alert report passes the validation checks and is determined to be valid, transmit the current alert report to a manager associated with at least one of the user ID or the institution ID of the activity report in accordance with the rule, and store a response to the current alert report.

9. The system of claim 8, wherein to determine whether the current alert report is valid or invalid, the platform server is configured to perform validation checks on the current alert report based on alert report volumes associated with the at least one of the user ID or the institution ID of the activity report, and wherein to determine that the current alert report is invalid, the platform server is configured to:
determine an expected alert report volume, the platform server further configured to determine a mean number of alert reports associated with the at least one of the user ID or the institution ID of the activity report and indicative of the same risky behavior as the current alert report generated during a first time period;

determine a number of total alert reports associated with the at least one of the user ID or the institution ID of the activity report and indicative of the same risky behavior as the current alert report generated during a second time period that includes the current alert report and is subsequent to the first time period, the number of total alert reports including the current alert report;

when the number of total alert reports is outside of an expected range defined with respect to the expected alert report volume, identify an unexpected alert report volume of alert reports indicative of the same risky behavior as the current alert report and generated during the second time period; and determine that the current alert report does not pass the validation checks and is invalid.

10. The system of claim 9, wherein the expected range is defined as at least two standard deviations from the mean number of alert reports.

11. The system of claim 9, wherein the first time period is two weeks.

12. The system of claim 8, wherein to determine that the current alert report is invalid, the platform server is configured to:

designate, based on the rule associated with the at least one of the user ID or the institution ID of the activity report, at least one data field in the current alert report as the required data field;

when the required data field in the current alert report does not include a data value in a valid range, identify invalid data values for the required data field in the current alert report; and determine that the current alert report does not pass the validation checks and is invalid.

13. The system of claim 8, further comprising a data warehouse connected to the end-user system and the platform server, the data warehouse configured to:

assign a category to the activity report based on the activity data included in the activity report; and populate a data table in a report database with the activity data of the activity report, wherein the data table is associated with the category of the activity report, and wherein the data table has flexible input fields, wherein the flexible input fields of the data table are populated by activity data of a plurality of activity reports assigned to the same category, wherein one or more of the activity reports have activity data that includes one or more different data fields that are not shared by all activity reports assigned to the same category.

14. The system of claim 8, wherein to determine that the current alert report is invalid, the platform server is configured to:

designate, based on the rule associated with the at least one of the user ID or the institution ID of the activity report, at least one data field in the current alert report as the required data field;

when the required data field in the current alert report does not include a data value, identify missing data values for the required data field in the current alert report; and determine that the current alert report does not pass the validation checks and is invalid.

15. A non-transitory computer-readable medium comprising instructions that, when executed, cause a system to:

receive, by an end-user system of an institution, data representative of a plurality of actions performed by employees of the institution via a plurality of computer devices at one or more institution locations communicatively coupled to the end-user system via a network;

receive, by a platform server connected to the end-user system and from one of the end-user system or a computer device of the plurality of computer devices, an activity report that includes activity data for an action of the plurality of actions performed by a given employee via the computer device at a given institution location of the one or more institution locations, wherein the activity data includes a user identifier (ID) associated with the given employee and an institution ID associated with the given institution location;

select, by the platform server, a rule to apply to the activity report based on at least one of the user ID or the institution ID of the activity report;

apply, by the platform server executing a rules engine, the rule to the activity report;

when the rule indicates that the activity report is indicative of risky behavior, generate, by the platform server, a current alert report;

determine, by the platform server, whether the current alert report is valid or invalid by performing validation checks on the current alert report based on valid data values associated with the at least one of the user ID or the institution ID of the activity report, wherein to determine that the current alert report is invalid, the instructions cause the platform server to identify missing or invalid data values for a required data field in the current alert report;

when the current alert report does not pass the validation checks and is determined to be invalid, discard, by the platform server, the current alert report; and when the alert report passes the validation checks and is determined to be valid, transmit, by the platform server, the current alert report to a manager associated with at least one of the user ID or the institution ID of the activity report in accordance with the rule, and store, by the platform server, a response to the alert report.

16. The computer-readable medium of claim 15, wherein to determine whether the current alert report is valid or invalid, the instructions cause the platform server to perform validation checks on the current alert report based on alert report volumes associated with the at least one of the user ID or the institution ID of the activity report, and wherein to determine that the current alert report is invalid, the instructions cause the platform server to:

determine an expected alert report volume, the instructions further cause the platform server to determine a mean number of alert reports associated with the at least one of the user ID or the institution ID of the activity report and indicative of the same risky behavior as the current alert report generated during a first time period;

determine a number of total alert reports associated with the at least one of the user ID or the institution ID of the activity report and indicative of the same risky behavior as the current alert report generated during a second time period that includes the current alert report and is subsequent to the first time period, the number of total alert reports including the current alert report;

when the number of total alert reports is outside of an expected range defined with respect to the expected alert report volume, identify an unexpected alert report volume of alert reports indicative of the same risky behavior as the current alert report and generated during the second time period; and determine that the current alert report does not pass the validation checks and is invalid.

17. The computer-readable medium of claim 15, wherein to determine that the current alert report is invalid, the instructions cause the platform server to:
designate, by the rule associated with the at least one of the user ID or the institution ID of the activity report, at least one data field included in the current alert report as the required data field;
when the required data field in the current alert report does not include a data value in a valid range, identify invalid data values for the required data field in the current alert report; and
determine that the current alert report does not pass the validation checks and is invalid.

18. The computer-readable medium of claim 15, further comprising instructions that, when executed, cause the system to:
assign, by a data warehouse connected to the end-user system and the platform server, a category to the activity report based on the activity data included in the activity report; and
populate, by the data warehouse, a data table in a report database with the activity data of the activity report, wherein the data table is associated with the category of the activity report, and wherein the data table has flexible input fields,
wherein the flexible input fields of the data table are populated by activity data of a plurality of activity reports assigned to the same category, wherein one or more of the activity reports have activity data that includes one or more different data fields that are not shared by all activity reports assigned to the same category.

19. The computer-readable medium of claim 15, wherein to determine that the current alert report is invalid, the instructions cause the platform server to:
designate, by the rule associated with the at least one of the user ID or the institution ID of the activity report, at least one data field included in the current alert report as the required data field;
when the required data field in the current alert report does not include a data value, identify missing data values for the required data field in the current alert report; and
determine that the current alert report does not pass the validation checks and is invalid.

* * * * *

UNITED STATES PATENT AND TRADEMARK OFFICE
CERTIFICATE OF CORRECTION

PATENT NO. : 11,645,603 B1
APPLICATION NO. : 16/717825
DATED : May 9, 2023
INVENTOR(S) : Kimberly P. Baker et al.

Page 1 of 1

It is certified that error appears in the above-identified patent and that said Letters Patent is hereby corrected as shown below:

In the Claims

Column 11, Line 33 (Claim 3): Replace "deviations around from the mean" with --deviations from the mean--

Signed and Sealed this
Fourteenth Day of January, 2025

Derrick Brent
*Acting Director of the United States Patent and Trademark Office*